(12) United States Patent
Wu et al.

(10) Patent No.: US 11,304,106 B2
(45) Date of Patent: Apr. 12, 2022

(54) METHOD AND DEVICE FOR CAMPING

(71) Applicant: VIVO MOBILE COMMUNICATION CO., LTD., Guangdong (CN)

(72) Inventors: Yumin Wu, Chang'an Dongguan (CN); Yue Ma, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 16/957,352

(22) PCT Filed: Dec. 29, 2018

(86) PCT No.: PCT/CN2018/125470
§ 371 (c)(1),
(2) Date: Jun. 23, 2020

(87) PCT Pub. No.: WO2019/134617
PCT Pub. Date: Jul. 11, 2019

(65) Prior Publication Data
US 2020/0336959 A1 Oct. 22, 2020

(30) Foreign Application Priority Data

Jan. 3, 2018 (CN) .......................... 201810005083.1

(51) Int. Cl.
*H04W 36/06* (2009.01)
*H04W 36/00* (2009.01)
(Continued)

(52) U.S. Cl.
CPC ....... *H04W 36/06* (2013.01); *H04W 36/0069* (2018.08); *H04W 36/0072* (2013.01); *H04W 36/30* (2013.01); *H04W 68/02* (2013.01)

(58) Field of Classification Search
CPC ............. H04W 36/06; H04W 36/0069; H04W 36/0072; H04W 36/30; H04W 68/02; H04W 48/20
See application file for complete search history.

(56) References Cited

U.S. PATENT DOCUMENTS

| 9,794,157 B2 | 10/2017 | Xu et al. |
| 2017/0181049 A1 | 6/2017 | Chou et al. |

(Continued)

FOREIGN PATENT DOCUMENTS

| CN | 103731896 A | 4/2013 |
| CN | 105359611 A | 2/2016 |

(Continued)

OTHER PUBLICATIONS

CN Search Report in Application No. 201810005083.1 dated Mar. 12, 2020.

(Continued)

*Primary Examiner* — Harry H Kim
(74) *Attorney, Agent, or Firm* — Maschoff Brennan

(57) ABSTRACT

The embodiments of the present disclosure provide a method and a device for camping. The method includes: receiving selection or reselection configuration information, wherein the selection or reselection configuration information indicates a location of a bandwidth part (BWP) or a beam; and according to the selection or reselection configuration information, camping on the BWP or beam on which the corresponding UE is able to camp.

18 Claims, 5 Drawing Sheets

(51) Int. Cl.
*H04W 36/30* (2009.01)
*H04W 68/02* (2009.01)
*H04W 48/20* (2009.01)

(56) References Cited

U.S. PATENT DOCUMENTS

| | | |
|---|---|---|
| 2017/0367120 A1 | 12/2017 | Murray et al. |
| 2020/0229180 A1* | 7/2020 | Liu .................... H04W 72/0453 |
| 2020/0322031 A1* | 10/2020 | You .................... H04W 72/046 |
| 2021/0176664 A1* | 6/2021 | Liu .................... H04W 28/085 |

FOREIGN PATENT DOCUMENTS

| | | |
|---|---|---|
| CN | 105519188 A | 4/2016 |
| CN | 106900023 A | 6/2017 |
| WO | 2016/096006 A1 | 6/2016 |
| WO | 2017/054432 A1 | 4/2017 |

OTHER PUBLICATIONS

"Intra and inter frequency measurement definition in multiple reference signal transmission scenario" 3GPP TSG-RAN WG4 Meeting NR#3, Sep. 18, 2017.

Written Opinion in Application No. PCT/CN2018/125470 dated Jul. 16, 2020.

\* cited by examiner

METHOD AND DEVICE FOR CAMPING

CROSS-REFERENCE TO RELATED APPLICATION

This application is the U.S. national phase of PCT Application No. PCT/CN2018/125470 filed on Dec. 29, 2018, which claims priority to Chinese Patent Application No. 201810005083.1 filed on Jan. 3, 2018, the disclosures of which are incorporated in their entirety by reference herein.

TECHNICAL FIELD

The present disclosure relates to the field of communication technology, and in particular to a method and a device for camping.

BACKGROUND

With the development of mobile communication technology, more and more technologies have been introduced to improve communication efficiency. For example:

(1) Introduction to Bandwidth Part (BWP):

In the fifth-generation (5G) mobile communication system, a User Equipment (UE) may only support a relative small working bandwidth (such as 5 MHz), while a cell on the network side may support a relatively large bandwidth (such as 100 MHz), and the small bandwidth in this large bandwidth in which the UE works are considered as a BWP.

The network side configures one or more BWPs for the UE, and changes the BWP in which the UE may works by activating or deactivating the BWP.

The network side will configure a default BWP. When the UE works in another BWP in the cell, the network side may configure a timer for the UE to work in another BWP in the cell. When the timer expires, the UE will switch back to the default BWP.

(2) Introduction to multi-beam:

In the future 5G system, in order to achieve the target of the downlink transmission rate of 20 Gbps and the uplink transmission rate of 10 Gbps, high-frequency communication and large-scale antenna technology will be introduced. High-frequency communication can provide a wider system bandwidth, and the antenna size can be smaller, which is more conducive to the deployment of large-scale antennas in base stations and UEs. Multi-beam/multi-TRP transmission and reception on the base station side, and multi-beam transmission and reception on the UE side will be widely used. Taking the Physical Uplink Sharing Channel (PUSCH) of New Radio (NR) as an example, refer to FIG. 1, it shows the process of uplink multi-beam transmission. The communication system shown in FIG. 1 includes a UE 11, a TRP 12, a first PUSCH 13 and a second PUSCH 14.

(3) Introduction to Long Term Evolution (LTE) cell selection and reselection:

For the idle UE of LTE, it is necessary to camp on a cell so that the paging message on the network side can be received and the connection establishment process can be initiated in the camping cell. The process of finding the camping cell includes: cell selection and cell reselection, wherein:

in a 5G system, there will be multiple BWP or beam in a cell, and one or more BWP and one or more beam will be detected by the UE in IDLE or INACTIVE state. At this time, if the UE camps on any BWP or beam, it may cause congestion on certain BWP or beam.

SUMMARY

According to a first aspect of the present disclosure, a method for camping applied to a user equipment (UE) is provided. The method includes: receiving selection or reselection configuration information, wherein the selection or reselection configuration information indicates a location of a bandwidth part (BWP) or a beam; and according to the selection or reselection configuration information, camping on the BWP or beam on which the corresponding UE is able to camp.

According to a second aspect of the present disclosure, a method for camping applied to a network-side device is further provided. The method includes: sending the selection or reselection configuration information to the UE, wherein the UE camps on the BWP or beam on which the corresponding UE is able to camp according to the selection or reselection configuration information, the selection or reselection configuration information indicates a location of a bandwidth part (BWP) or a beam.

According to a third aspect of the present disclosure, a user equipment (UE) is further provided, which includes: a receiving module configured to receive the selection or reselection configuration information, wherein the selection or reselection configuration information indicates a location of a bandwidth part (BWP) or a beam; and a first processing module configured to camp on the BWP or beam on which the corresponding UE is able to camp according to the selection or reselection configuration information.

According to a fourth aspect of the present disclosure, a network-side device is further provided, which includes: a sending module configured to send the selection or reselection configuration information to the UE, wherein the UE camps on the BWP or beam on which the corresponding UE is able to camp according to the selection or reselection configuration information.

According to a fifth aspect of the present disclosure, a user equipment is further provided, which includes: a processor, a storage, and a computer program stored on the storage and capable of running on the processor, the computer program performing, when executed by the processor, the steps of the method for camping according to the first aspect.

According to a sixth aspect of the present disclosure, a network-side device is further provided, which includes: a processor, a storage, and a computer program stored on the storage and capable of running on the processor, the computer program performing, when executed by the processor, the steps of the method for camping according to the second aspect.

According to a seventh aspect of the present disclosure, a computer readable storage medium is further provided, the computer readable storage medium having a computer program stored thereon, the computer program performing, when executed by a processor, the steps of the method for camping according to the first aspect; or the steps of the method for camping according to the second aspect.

BRIEF DESCRIPTION OF THE DRAWINGS

By reading the detailed description of the preferred embodiments below, various other advantages and benefits will become apparent to those of ordinary skill in the art. The drawings are only for the purpose of showing the preferred embodiments, and are not considered as limitations to the present disclosure. Furthermore, like reference numerals are used to denote like parts throughout the drawings. In the drawings.

DETAILED DESCRIPTION

Figure 1:
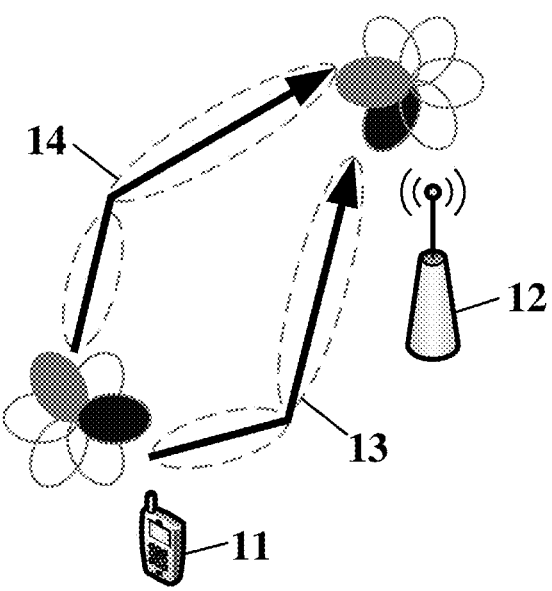
FIG. 1 is a diagram of a process of uplink multi-beam transmission.

The technical solutions in the embodiments of the present disclosure will be described clearly and thoroughly in conjunction with the drawings in the embodiments of the present disclosure. Obviously, the described embodiments are some of the embodiments of the present disclosure, but not all of the embodiments. Based on the embodiments in the present disclosure, all other embodiments obtained by those of ordinary skill in the art without paying any creative work fall within the protection scope of the present disclosure.

The term "comprising" and any variations thereof in the description and claims of this application are intended to cover non-exclusive inclusions, for example, a process, a method, a system, a product or a device that includes a series of steps or units need not be limited to those steps or units that are explicitly listed, but may include other steps or units that are not explicitly listed or inherent to the process, the method, the product, or the device. In addition, "and/or" is used in the description and claims to mean at least one of the connected objects, for example, "A and/or B" means that there are three cases including A alone, B alone, and both A and B.

In the embodiments of the present disclosure, the words "exemplary" or "for example" are used to indicate examples, illustrations or explanations. Any embodiment or design described in the embodiments of the present disclosure as "exemplary" or "for example" should not be construed as more preferred or advantageous than other embodiments or designs. Rather, the use of the words "exemplary" or "for example" is intended to present related concepts in a specific manner.

In order to facilitate understanding of the process of camping on a cell, an introduction to the cell selection and reselection in the process of camping on a cell will be provided:

a, cell selection: used for UE to select a cell to camp on when there is no camping cell. A criterion for the cell selection is called the S criterion. When the channel quality of a cell meets the S criterion, it can be selected as the camping cell. The contents of S criteria are as follows: Srxlex>0 and Squal>0, wherein:

$$Srxlex = Q_{relevmeas} - (Q_{rxlevmin} + Q_{rxlevminoffset}) - P_{compensation} - Qoffset_{temp};$$

$$Squal = Q_{qualmeas} - (Q_{qualmin} + Q_{qualminoffset}) - Qoffset_{temp};$$

Srxlex represents the signal strength of the received cell selection; Squal represents the signal quality of the received cell selection; $Qoffset_{temp}$ represents the temporary offset of the cell; $Q_{rxlevmeas}$ represents the reference signal reception power (RSRP) value of the measured cell; $Q_{qualmeas}$ represents the reference signal reception quality (RSRQ) value of the measured cell; $Q_{rxlevmin}$ represents the minimum reception strength requirement of the RSRP of the cell; $Q_{qualmin}$ represents the minimum reception quality requirement of the RSRQ of the cell; $Q_{rxlevminoffset}$ represents an offset to the $Q_{rxlevmin}$, when the UE is camping on a Visiting Public Land Mobile Network (VPLMN) to search for high priority Public Land Mobile Network (PLMN), and the cell quality is evaluated using $S_{rxlex}$; $Q_{qualminoffset}$ represents an offset to the $Q_{qualmin}$, when the UE is camping on the VPLMN to search for high priority PLMN, and the cell quality is evaluated using Squal; $P_{compensation}$ represents a compensation value.

b, cell reselection: when the UE already has a camping cell, the cell to be camped on is changed due to movement of the UE. Cell reselection includes: different frequency cell reselection with the same frequency and the same priority, and different frequency cell reselection with different priority.

For the different frequency cell reselection with the same frequency and the same priority, a R criterion is adopted. The contents of the R criterion are as follows:

$$R_s = Q_{meas,s} + Q_{Hyst} - Qoffset_{temp} + Qoffset_{SCPTM};$$

$$Rn = Q_{meas,n} - Qoffset - Qoffset_{temp} + Qoffset_{SCPTM};$$

wherein, $R_s$ represents the signal quality of the service cell, and $R_n$ represents the signal quality of the neighboring cell. The cell reselected by the UE is the cell with the best signal quality (that is, the maximum value of $R_s$ and $R_n$).

$Q_{meas,s}$ represents the amount of RSRP measurement used in the process of cell reselection;

Qoffset: for intra-frequency reselection: if the inter-cell offset $Qoffset_{s,n}$ has been configured, Qoffset is equal to $Qoffset_{s,n}$, otherwise Qoffset is equal to zero. For inter-frequency reselection: if the inter-cell offset $Qoffset_{s,n}$ has been configured, Qoffset is equal to $Qoffset_{s,n}$ plus an inter-frequency offset $Qoffset_{frequency}$, otherwise Qoffset is equal to $Qoffset_{frequency}$;

$Qoffset_{temp}$ represents the temporary offset of the cell;

$Qoffset_{SCPTM}$ represents the temporary offset for single-cell point-to-multipoint (SC-PTM) frequency points, and if $Qoffset_{SCPTM}$ is configured, Qoffset is not used;

$Q_{Hyst}$, represents a speed-based scaling factor. In the high-speed moving state, the value is sf-High, and the value is sf-Medium in the medium-speed moving state. In other states, this factor is not used. When the number of reselected cells by the UE exceeds the threshold NCR_H within a specified period of time, it is in a state of high-speed movement. When the number of reselection cells by the UE exceeds the threshold NCR_M within a specified period of time, it is in a state of medium-speed movement.

For the reselection of different frequency cells with different priorities, depending on the priority order configured by the network, when the S value of the high priority frequency cell (such as Squal or Srxlev) is greater than the threshold value configured by the network, and the duration exceeds the time threshold value configured by the network, the UE reselects the high priority frequency cell.

Figure 2:
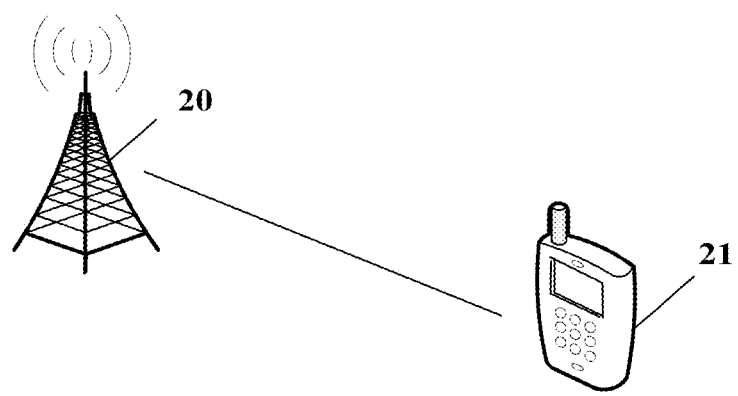
FIG. 2 is a diagram of an architecture of a wireless communication system according to an embodiment of the present disclosure.

The embodiments of the present disclosure will be described below with reference to the drawings. The method and device for camping provided by the embodiments of the present disclosure can be applied to a wireless communication system. The wireless communication system may be a 5G system. Referring to FIG. 2, it is a diagram of an architecture of a wireless communication system according to an embodiment of the present disclosure. As shown in FIG. 2, the wireless communication system may include: a network-side device 20 and a user equipment. For example, the user equipment is referred to as UE 21. The UE 21 can communicate with the network-side device 20. In practical applications, the connection between the above devices may be a wireless connection. To conveniently and intuitively represent the connection relationship between the devices, solid lines are used in FIG. 2.

It should be noted that the above communication system may include multiple UEs, and the network-side device may communicate with multiple UEs (transmitting signaling or data).

The network-side device provided in the embodiments of the present disclosure may be a base station. The network-side device may be a commonly used base station, or an evolved node base station (eNB), or may be a network-side device in a 5G system (e.g., the next generation node base station (gNB) or the transmission and reception point (TRP)), or the like.

The user equipment provided in the embodiments of the present disclosure may be a mobile phone, a tablet, a notebook, an Ultra-Mobile Personal Computer (UMPC), a netbook, or a Personal Digital Assistant (PDA).

Figure 3:
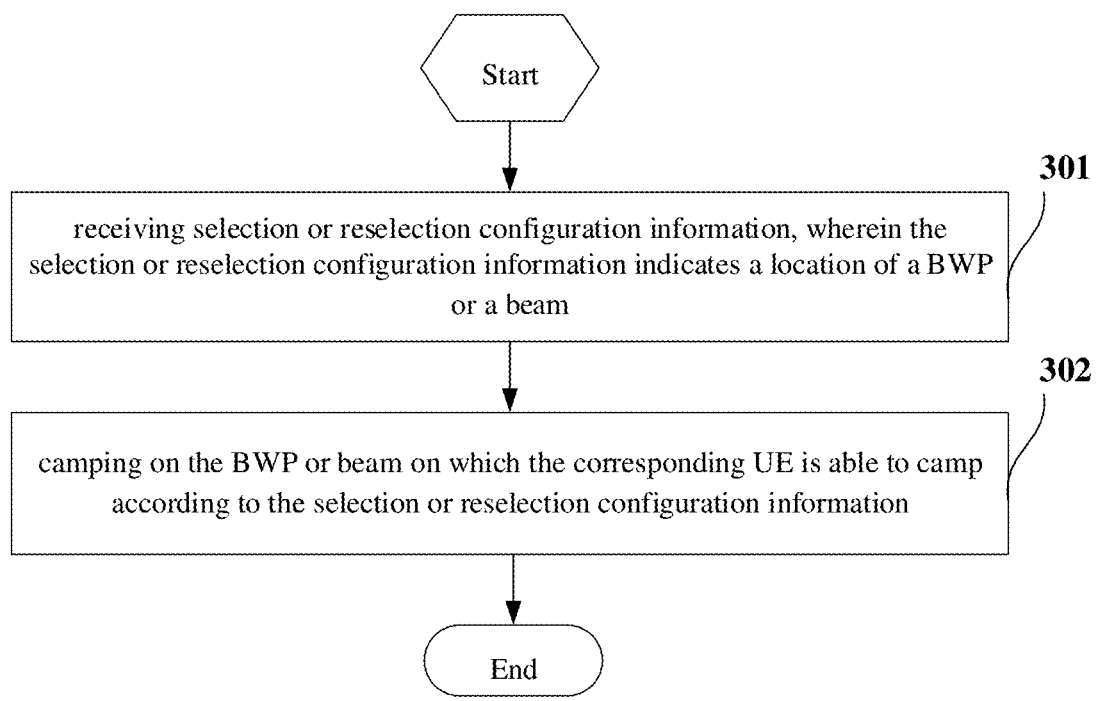
FIG. 3 is a first flowchart of the method for camping according to an embodiment of the present disclosure.

Referring to FIG. 3, it shows a flow of the method for camping according to an embodiment of the present disclosure. The method may be executed by a UE, and include the following steps:

Step 301, receiving selection or reselection configuration information, wherein the selection or reselection configuration information indicates a location of a bandwidth part (BWP) or a beam;

in the embodiment of the present disclosure, optionally, the selection or reselection configuration information may include arbitrary combination of one or more of: selection configuration information of a BWP or a beam; and, reselection configuration information of a BWP or a beam.

Optionally, the selection configuration information of a BWP or a beam may include arbitrary combination of one or more of: one or more offset; minimum received signal strength requirements; minimum received signal quality requirements; compensation amount; reference signal type (e.g. synchronization information block (SSB) or channel state information reference signal (CSI-RS)); subcarrier spacing (SCS); and BWP identification information or beam identification information.

Taking the selection configuration information of a BWP as an example: the offset may be $Qoffset_{temp}(BWP\_i)$ and/or $Q_{rxlevminoffset}(BWP\_i)$ and/or $Q_{qualminoffset}(BWP\_i)$; the minimum received signal quality requirement may be $Q_{qualmin}(BWP\_i)$; the compensation amount may be $P_{compensation}(BWP\_i)$. It should be noted that the selection configuration information of a beam is similar to the above, and is not repeated here.

Optionally, the reselection configuration information of a BWP or a beam may include arbitrary combination of one or more of: one or more offsets; one or more speed-based scaling factor; minimum received signal strength requirements; minimum received signal quality requirements; reselection evaluation time; reference signal type (e.g. SSB or CSI-RS); subcarrier spacing; threshold value for initiating non-service BWP or beam measurement; priority identification (e.g. priority 1); and BWP identification information or beam identification information.

Taking the reselection configuration information of a BWP as an example: the offset may be Qoffset (BWP_i) and/or $Qoffset_{temp}(BWP\_i)$; the speed-based scaling factor may take a value of sf-High (BWP_i) in a high-speed moving state, and take a value of sf-Medium (BWP_i) in a medium-speed moving state; in other states, the scaling factor is not used, i.e. the scaling factor is "0"; the minimum received signal strength requirement may be $Thresh_{X, HighP}$ (BWP_i); the minimum received signal quality requirement may be $Treselection_{RAT}(BWP\_i)$; the reselection evaluation time may be Snonintrasearch (BWP_i)); the threshold value for initiating non-service BWP measurement may be Snonintrasearch (BWP_i)). Note that the reselection configuration information of a beam is similar to the above, and is not repeated here.

Among others, initiating a non-service BWP or beam measurement should satisfy the following criteria: the S value of the selection criterion of one or more service BWP or beam is less than or equal to the configured threshold value.

In an example of initiating a non-service BWP measurement: the S value is Squal (BWP_i) and/or Srxlev (BWP_i), the threshold value is Snonintrasearch (BWP_i). Note that initiating a non-service beam measurement is similar to the above, and is not repeated here.

In an embodiment of the present disclosure, optionally, the BWP identification information includes arbitrary combination of one or more of: a BWP identifier, a frequency identifier, a frequency offset identifier (e.g., an offset to certain reference frequency (central frequency) of a corresponding cell), a bandwidth identifier, a Physical Resource Block (PRB) identifier and a PRB offset identifier (e.g., corresponding to the offset of a certain reference PRB (such as PRB of number 0) in the cell).

In an embodiment of the present disclosure, optionally, the beam identification information includes arbitrary combination of one or more of: a synchronization signal block identifier, a channel state information-reference signal (CSI-RS) identifier, a beam identifier, a beam pair identifier, and a transmission node identifier.

Step 302, camping on the BWP or beam on which the corresponding UE is able to camp according to the selection or reselection configuration information.

In the embodiment of the present disclosure, optionally, the BWP on which the UE is able to camp includes arbitrary combination of one or more of the following: the BWP containing the synchronization information block (SSB), the BWP containing the channel state information reference signal (CSI-RS), the BWP containing the cell-defining SSB, the default BWP and the initial BWP.

The beam on which the UE is able to camp includes arbitrary combination of one or more of the following: the beam containing SSB, the beam containing CSI-RS, the beam containing the cell-defining SSB, the default beam and the initial beam.

In the embodiment of the present disclosure, the camping on the BWP or beam on which the corresponding UE is able to camp may be realized by Mode 1 and Mode 2:

Mode 1: According to the selection configuration information of BWP or beam, one or more BWP or beam on which the UE can camp is selected to camp on.

In the embodiment of the present disclosure, one or more BWP or beam on which the UE can camp is selected in any order or from any one of the following: selecting a cell or frequency to camp on, selecting a BWP to camp on, and selecting a beam to camp on.

In the embodiment of the present disclosure, the selection of one or more BWP or beam on which the UE can camp to camp on may be any one of the following modes:

Mode a: When only one BWP or beam to be camped on is allowed to be selected, any BWP or beam satisfying the first criterion that can be camped on by the UE is selected according to the selection configuration information.

Mode b: When only one BWP or beam to be camped on is allowed to be selected, according to the selection configuration information, a BWP or beam satisfying the first criterion and having the best signal quality or the best signal strength can be selected as the BWP or beam on which the UE is able to camp.

Mode c: When more than one BWP or beam to be camped on is allowed to be selected, according to the selection configuration information, more than one BWP or beam satisfying the first criterion that can be camped on by the UE is selected according to the selection configuration information.

When there is one or more BWP or beam among the selected one or more BWP or beam that does not satisfy the first criterion, according to the selection configuration information, the BWP or beam that does not satisfy the first criterion is not selected to be camped on. And when one or more BWP or beam satisfying the first criterion has been selected to be camped on, if there is other BWP or beam on which the UE is able to camp satisfies the first criterion, according to the selection configuration information, those other BWPs or beams on which the UE is able to camp and which satisfy the first criterion are additionally selected.

It should be noted that the above-mentioned first criterion may be that: the measurement result of BWP or beam is greater than the configured threshold value, the configured threshold value is not limited in the embodiment of the present disclosure.

For example, when selecting a BWP on which the UE can camp, the first criterion is: Srxlex (BWP_i)>0 and/or Squal (BWP_i)>0, wherein:

$$\text{Srxlex}(BWP\_i)=Q_{rxlevmeas}(BWP\_i)-(Q_{rxlevmin}(BWP\_i)+Q_{rxlevminoffset}(BWP\_i))-P_{compensation}(BWP\_i)-Q\text{offset}_{temp}(BWP\_i);$$

$$\text{Squal}(BWP\_i)=Q_{qualmeas}(BWP\_i)-(Q_{qualmin}(BWP\_i)+Q_{qualminoffset}(BWP\_i))-Q\text{offset}_{temp}(BWP\_i);$$

wherein, Srxlex (BWP_i) represents the signal strength of the received BWP selection in dB;

Squal (BWP_i) represents the signal quality of the received BWP selection in dB;

$Q\text{offset}_{temp}$(BWP_i) represents the temporary offset of the BWP in dB;

$Q_{rxlevmeas}$(BWP_i) represents the RSRP value of the measured BWP in dBm;

$Q_{qualmeas}$(BWP_i) represents the RSRQ value of the measured BWP in dB;

$Q_{rxlevmin}$(BWP_i) represents the minimum reception strength requirement of the RSRP of the BWP in dBm;

$Q_{qualmin}$(BWP_i) represents the minimum reception quality requirement of the RSRQ of the BWP in dB;

$Q_{rxlevminoffset}$(BWP_i) represents an offset to the RSRP of the BWP;

$Q_{qualminoffset}$(BWP_i) represents an offset to the RSRQ of the BWP;

$P_{compensation}$(BWP_i) represents a compensation value of the BWP.

For example, when selecting a beam on which the UE can camp, the first criterion is: Srxlex (beam_i)>0 and/or Squal (beam_i)>0, wherein:

$$\text{Srxlex}(beam\_i)=Q_{rxlevmeas}(beam\_i)-(Q_{rxlevmin}(beam\_i)+Q_{rxlevminoffset}(beam\_i))-P_{compensation}(beam\_i)-Q\text{offset}_{temp}(beam\_i);$$

$$\text{Squal}(beam\_i)=Q_{qualmeas}(beam\_i)-(Q_{qualmin}(beam\_i)+Q_{qualminoffset}(beam\_i))-Q\text{offset}_{temp}(beam\_i);$$

wherein, Srxlex (beam_i) represents the signal strength of the received beam selection in dB;

Squal (beam_i) represents the signal quality of the received beam selection in dB;

$Q\text{offset}_{temp}$(beam_i) represents the temporary offset of the beam in dB;

$Q_{rxlevmeas}$(beam_i) represents the RSRP value of the measured beam in dBm;

$Q_{qualmeas}$(beam_i) represents the RSRQ value of the measured beam in dB;

$Q_{rxlevmin}$(beam_i) represents the minimum reception strength requirement of the RSRP of the beam in dBm;

$Q_{qualmin}$(beam_i) represents the minimum reception quality requirement of the RSRQ of the beam in dB;

$Q_{rxlevmmoffset}$(beam_i) represents an offset to the RSRP of the beam;

$Q_{qualmmoffset}$(beam_i) represents an offset to the RSRQ of the beam;

$P_{compensation}$(beam_i) represents a compensation value of the beam.

Mode 2: According to the reselection configuration information of BWP or beam, one or more BWP or beam on which the UE can camp is reselected to camp on.

The reselection order of reselecting the BWP or beam on which the UE can camp may be any order or any one of the following: reselecting a cell or frequency to camp on, reselecting one or more BWP to camp on, and reselecting one or more beam to camp on.

In the embodiment of the present disclosure, when the BWP or beam on which the UE can camp is reselected to be camped on, according to the condition of inter-frequency reselection, it can be judged whether the BWP or beam on which the UE can camp is reselected by intra-frequency reselection or inter-frequency reselection. If the condition of inter-frequency reselection is satisfied, according to the reselection configuration information, the BWP or beam on which the UE can camp is reselected by inter-frequency reselection; otherwise, according to the reselection configuration information, the BWP or beam on which the UE can camp is reselected by intra-frequency reselection.

Further, the conditions for inter-frequency reselection include arbitrary combination of one or more of the following: the currently camped service frequency is different from the target frequency; the bandwidth of the currently camped service frequency is different from the bandwidth of the target frequency; the subcarrier spacing of the currently camped service frequency is different from that of the target frequency; and, the reference signal type of the currently camped service frequency is different from that of the target frequency, for example, the RS type of the measurement of the current service frequency is SSB, while the RS type of the measurement of the target frequency is CSI-RS.

In the embodiment of the present disclosure, the reselection of one or more BWP or beam on which the UE can camp to camp on may be any one of the following modes:

Mode a: When only one BWP or beam to be camped on is allowed to be reselected, any BWP or beam satisfying the second criterion that can be camped on by the UE is reselected according to the reselection configuration information.

Mode b: When only one BWP or beam to be camped on is allowed to be reselected, according to the reselection configuration information, a BWP or beam satisfying the second criterion and having the best signal quality or the best signal strength can be reselected as the BWP or beam on which the UE is able to camp.

Mode c: When more than one BWP or beam to be camped on is allowed to be reselected, more than one BWP or beam satisfying the second criterion that can be camped on by the UE is reselected according to the reselection configuration information.

The second criterion may be: reselecting the BWP or beam on which the UE is able to camp according to the priority of the configured BWP or beam.

For example, it is judged whether to reselect the BWP or beam on which the UE is able to camp by intra-frequency reselection or by inter-frequency reselection.

For the reselection with different priorities, depending on the priority order configured by the network, when the S value of the high priority BWP or beam is greater than the configured threshold value, and the duration exceeds the configured time threshold value, the UE reselects the high priority BWP or beam.

For the reselection with the same priority, $R_s$ represents the signal quality of the service BWP or beam, and $R_n$ represents the signal quality of the neighboring BWP or beam. The BWP or beam reselected by the UE is the BWP or beam with the best signal quality (that is, the maximum value of $R_s$ and $R_n$), or the BWP or beam having a signal quality exceeding a signal quality threshold value. The duration period of the measurement result of the BWP or beam satisfying the criterion is greater than or equal to the configured time threshold value.

In an example of reselecting BWP with the same priority, the signal quality threshold value is ThreshX, HighQ (BWP_i) and/or ThreshX, HighP (BWP_i); the time threshold value is TreselectionRAT (BWP_i).

$$R_s(\text{BWP\_i}) = Q_{meas,s}(\text{BWP\_i}) + Q_{Hyst}(\text{BWP\_i}) - Q\text{offset}_{temp}(\text{BWP\_i});$$

$$R_n(\text{BWP\_i}) = Q_{meas,n}(\text{BWP\_i}) - Q_{offset}(\text{BWP\_i}) - Q\text{offset}_{temp}(\text{BWP\_i});$$

wherein, $Q_{meas,s}(\text{BWP\_i})$ represents the amount of RSRP/RSRQ measurement used in the process of BWP_i reselection;

$Q_{offset}(\text{BWP\_i})$ represents an offset of BWP_i;

$Q\text{offset}_{temp}(\text{BWP\_i})$ represents the temporary offset of BWP_i;

$Q_{Hyst}(\text{BWP\_i})$ represents a speed-based scaling factor of BWP_i, the value of which is sf-High in the high-speed moving state, and the value is sf-Medium in the medium-speed moving state. The scaling factor is not used in other states, i.e. the scaling factor is "0".

In an example of reselecting BWP with the same priority, the signal quality threshold value is ThreshX, HighQ (beam_i) and/or ThreshX, HighP (beam_i); the time threshold value is TreselectionRAT (beam_i).

$$R_s(\text{beam\_i}) = Q_{meas,s}(\text{beam\_i}) + Q_{Hyst}(\text{beam\_i}) - Q\text{offset}_{temp}(\text{beam\_i});$$

$$R_n(\text{beam\_i}) = Q_{meas,n}(\text{beam\_i}) - Q_{offset}(\text{beam\_i}) - Q\text{offset}_{temp}(\text{beam\_i});$$

wherein, $Q_{meas,s}(\text{beam\_i})$ represents the amount of RSRP/RSRQ measurement used in the process of beam_i reselection;

$Q_{offset}(\text{beam\_i})$ represents an offset of beam_i;

$Q\text{offset}_{temp}(\text{beam\_i})$ represents the temporary offset of beam_i;

$Q_{Hyst}(\text{beam\_i})$ represents a speed-based scaling factor of beam_i, the value of which is sf-High in the high-speed moving state, and the value is sf-Medium in the medium-speed moving state. The scaling factor is not used in other states, i.e. the scaling factor is "0".

In this way, the UE in an IDLE or INACTIVE status can be assigned to different BWP or Beam for camping, so as to avoid the congestion of certain BWP or beam caused by the UE camping on any BWP or beam, thus the load can be balanced.

Figure 4:
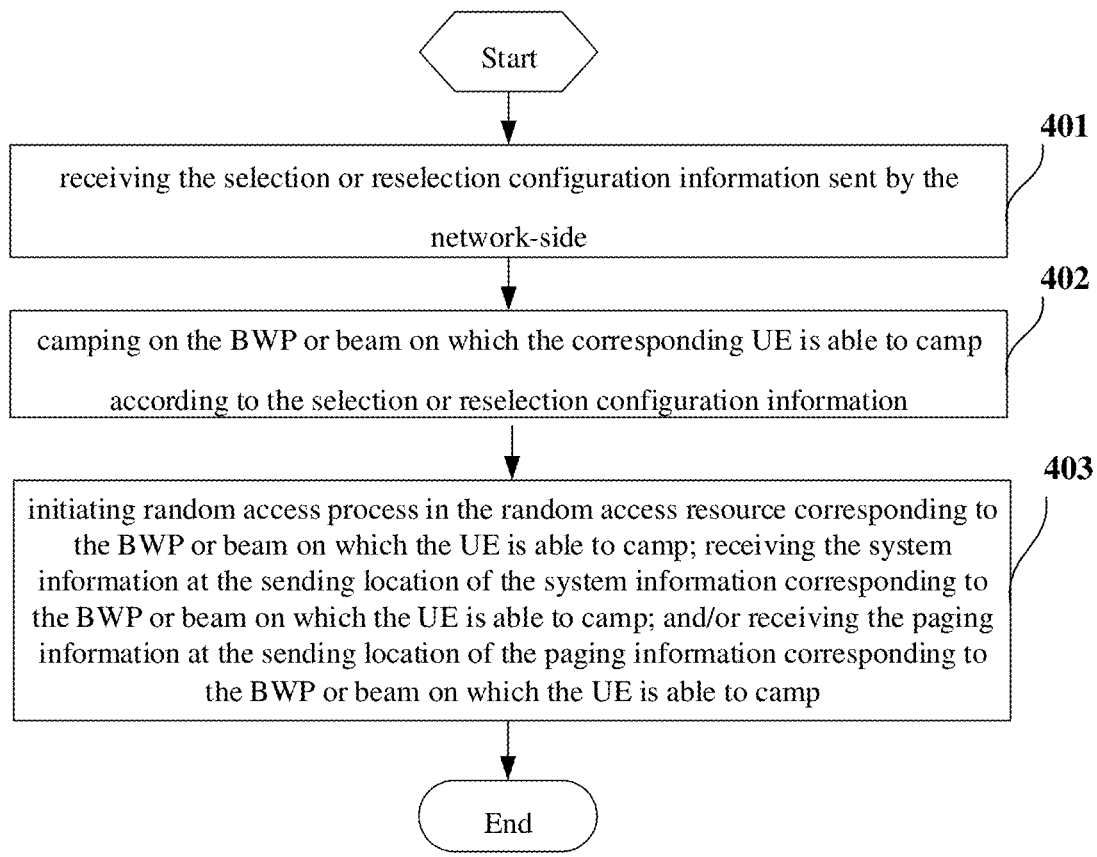
FIG. 4 is a second flowchart of the method for camping according to an embodiment of the present disclosure.

Referring to FIG. 4, it shows a flow of the method for camping according to an embodiment of the present disclosure. The method may be executed by a UE, and include the following steps:

Step 401, receiving the selection or reselection configuration information sent by the network-side, wherein the selection or reselection configuration information indicates a location of a bandwidth part (BWP) or a beam.

It should be noted that, the selection or reselection configuration information in the Step 401 is the same as that in the Step 301 of FIG. 3, the detail of which is omitted here.

Step 402, camping on the BWP or beam on which the corresponding UE is able to camp according to the selection or reselection configuration information.

Note that the implementation of Step 402 is the same as the Step 302 of FIG. 3, the introduction to Step 402 may refer to that of the Step 302, the detail of which is omitted here.

Step 403, initiating random access process in the random access resource corresponding to the BWP or beam on which the UE is able to camp; receiving the system information at the sending location of the system information corresponding to the BWP or beam on which the UE is able to camp; and/or receiving the paging information at the sending location of the paging information corresponding to the BWP or beam on which the UE is able to camp.

In the above Step 403, the behavior of the UE on one or more camping BWP or beam is described. Of course the present disclosure is not limited thereto.

In this way, the UE in an IDLE or INACTIVE status can be assigned to different BWP or Beam for camping, so as to avoid the congestion of certain BWP or beam caused by the UE camping on any BWP or beam, thus the load can be balanced.

In this way, the UE in an IDLE or INACTIVE status can be assigned to different BWP or Beam for camping, so as to avoid the congestion of certain BWP or beam caused by the UE camping on any BWP or beam, thus the load can be balanced.

In this way, the UE in an IDLE or INACTIVE status can be assigned to different BWP or Beam for camping, so as to avoid the congestion of certain BWP or beam caused by the UE camping on any BWP or beam, thus the load can be balanced.

Figure 5:
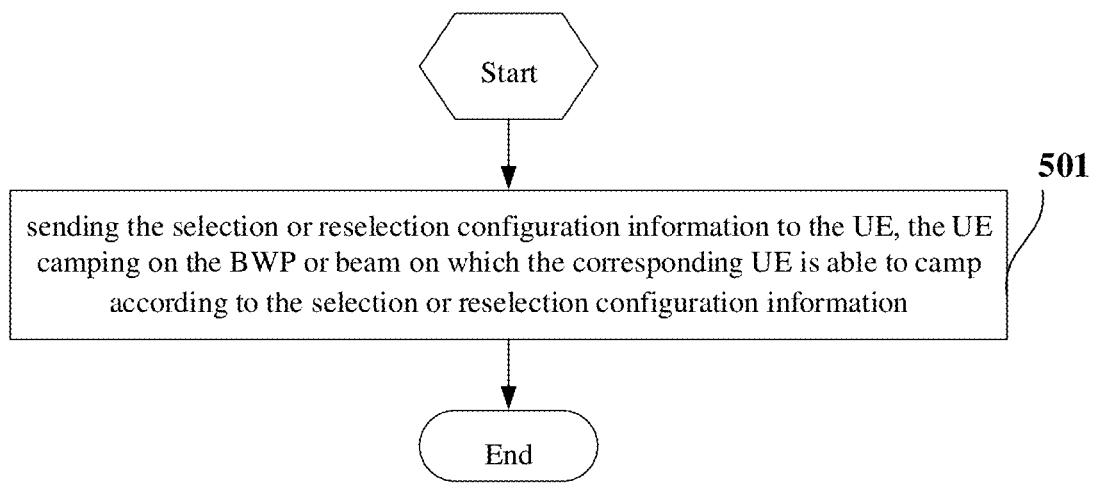
FIG. 5 is a third flowchart of the method for camping according to an embodiment of the present disclosure.

FIG. 5 shows the method for camping according to an embodiment of the present disclosure which is implemented by the network-side device, the method includes:

Step 501, sending the selection or reselection configuration information to the UE, the UE camping on the BWP or beam on which the corresponding UE is able to camp according to the selection or reselection configuration information, wherein the selection or reselection configuration information indicates a location of the BWP or the beam.

In the embodiment of the present disclosure, optionally, the BWP on which the UE is able to camp includes arbitrary combination of one or more of the following: the BWP containing the synchronization information block (SSB), the BWP containing the channel state information reference signal (CSI-RS), the BWP containing the cell-defining SSB, the default BWP and the initial BWP.

The beam on which the UE is able to camp includes arbitrary combination of one or more of the following: the beam containing SSB, the beam containing CSI-RS, the beam containing the cell-defining SSB, the default beam and the initial beam.

In the embodiment of the present disclosure, optionally, the selection or reselection configuration information may include arbitrary combination of one or more of: selection configuration information of the BWP or the beam; and, reselection configuration information of the BWP or the beam.

In the embodiment of the present disclosure, optionally, the selection configuration information of a BWP or a beam may include arbitrary combination of one or more of: one or more offset; minimum received signal strength requirements; minimum received signal quality requirements; compensation amount; reference signal type; subcarrier spacing; and BWP identification information or beam identification information.

In the embodiment of the present disclosure, optionally, the reselection configuration information of a BWP or a beam may include arbitrary combination of one or more of: one or more offsets; one or more speed-based scaling factor; minimum received signal strength requirements; minimum received signal quality requirements; reselection evaluation time; reference signal type; subcarrier spacing; threshold value for initiating non-service BWP or beam measurement; priority identification; and BWP identification information or beam identification information.

In the embodiment of the present disclosure, optionally, initiating a non-service BWP or beam measurement should satisfy the following criteria: the S value of the selection criterion of one or more service BWP or beam is less than or equal to the configured threshold value.

In an embodiment of the present disclosure, optionally, the BWP identification information includes arbitrary combination of one or more of: a BWP identifier, a frequency identifier, a frequency offset identifier, a bandwidth identifier, a PRB identifier and a PRB offset identifier.

In an embodiment of the present disclosure, optionally, the beam identification information includes arbitrary combination of one or more of: a synchronization signal block identifier, a CSI-RS identifier, a beam identifier, a beam pair identifier, and a transmission node identifier.

In this way, the UE in an IDLE or INACTIVE status can be assigned to different BWP or Beam for camping, so as to avoid the congestion of certain BWP or beam caused by the UE camping on any BWP or beam, thus the load can be balanced.

In some embodiments of the present disclosure, a user equipment is also provided which has the same principle as the method for camping in the above embodiments of the present disclosure. The implementation of the UE may refer to the method for camping, the details of which are omitted here.

Figure 6:
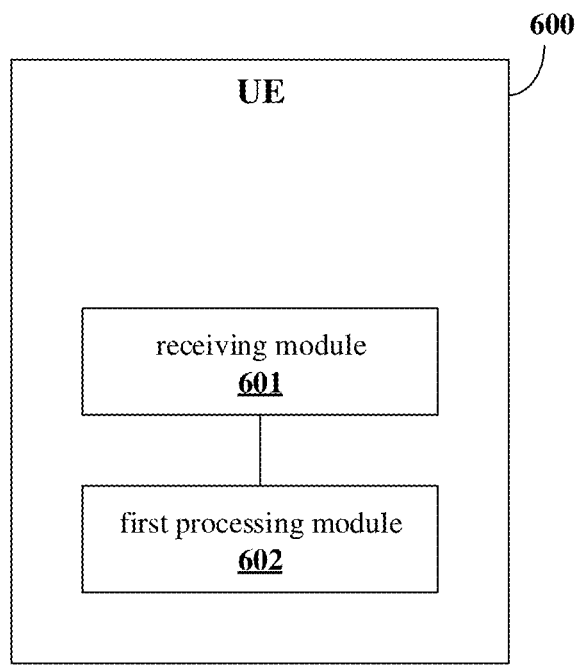
FIG. 6 is a first structural diagram of a UE according to an embodiment of the present disclosure.

Referring to FIG. 6, it shows the structure of the UE 600 according to an embodiment of the present disclosure, the UE 600 includes:

a receiving module 601 for receiving selection or reselection configuration information, wherein the selection or reselection configuration information indicates a location of a bandwidth part (BWP) or a beam; and a first processing module 602 for camping on the BWP or beam on which the corresponding UE is able to camp according to the selection or reselection configuration information.

In the embodiment of the present disclosure, optionally, the BWP on which the UE is able to camp includes arbitrary combination of one or more of the following: the BWP containing the synchronization information block (SSB), the BWP containing the channel state information reference signal (CSI-RS), the BWP containing the cell-defining SSB, default BWP and the initial BWP.

The beam on which the UE is able to camp includes arbitrary combination of one or more of the following: the beam containing SSB, the beam containing CSI-RS, the beam containing the cell-defining SSB, the default beam and the initial beam.

Further referring to FIG. 6, in the embodiment of the present disclosure, the first processing module 602 is configured for initiating random access process in the random access resource corresponding to the BWP or beam on which the UE is able to camp; receiving the system information at the sending location of the system information corresponding to the BWP or beam on which the UE is able to camp; and/or receiving the paging information at the sending location of the paging information corresponding to the BWP or beam on which the UE is able to camp.

In the embodiment of the present disclosure, optionally, the first processing module 602 is further configured for selecting one or more BWP or beam on which the UE can camp to camp on according to the selection configuration information of BWP or beam.

In the embodiment of the present disclosure, optionally, the BWP or beam on which the UE can camp is selected in any order or from any one of the following:

selecting a cell or frequency to camp on;
selecting one or more BWP to camp on; and
selecting one or more beam to camp on.

In the embodiment of the present disclosure, optionally, the first processing module 602 is further configured to: select any BWP or beam satisfying the first criterion that can be camped on by the UE according to the selection configuration information, when only one BWP or beam to be camped on is allowed to be selected; or select a BWP or beam satisfying the first criterion and having the best signal quality or the best signal strength as the BWP or beam on which the UE is able to camp according to the selection configuration information, when only one BWP or beam to be camped on is allowed to be selected; or select more than one BWP or beam which satisfies the first criterion and can be camped on by the UE according to the selection configuration information, when more than one BWP or beam to be camped on is allowed to be selected.

In the embodiment of the present disclosure, optionally, the first processing module 602 is further configured in such a manner: when there is one or more BWP or beam among the selected one or more BWP or beam that does not satisfy the first criterion, according to the selection configuration information, the BWP or beam that does not satisfy the first criterion is not selected to be camped on; or, when one or more BWP or beam satisfying the first criterion has been selected to be camped on, if there is other BWP or beam on which the UE is able to camp satisfies the first criterion, according to the selection configuration information, those other BWPs or beams on which the UE is able to camp and which satisfy the first criterion are additionally selected.

In the embodiment of the present disclosure, optionally, the first criterion may be that: the measurement result of BWP or beam is greater than the configured threshold value.

In the embodiment of the present disclosure, optionally, the first processing module 602 is further configured to: reselect one or more BWP or beam on which the UE can camp to camp on according to the reselection configuration information of BWP or beam.

In the embodiment of the present disclosure, optionally, the reselection order of reselecting the BWP or beam on which the UE can camp may be any order or any one of the following:

reselecting a cell or frequency to camp on;
reselecting one or more BWP to camp on; and
reselecting one or more beam to camp on.

In the embodiment of the present disclosure, optionally, the first processing module 602 is further configured to: judge whether the BWP or beam on which the UE can camp is to be reselected by intra-frequency reselection or inter-frequency reselection, according to the condition of inter-frequency reselection;

if the condition of inter-frequency reselection is satisfied, according to the reselection configuration information, the BWP or beam on which the UE can camp is reselected by inter-frequency reselection; if not, according to the reselection configuration information, the BWP or beam on which the UE can camp is reselected by intra-frequency reselection.

The conditions for inter-frequency reselection include arbitrary combination of one or more of the following:

the currently camped service frequency is different from the target frequency; the bandwidth of the currently camped service frequency is different from the bandwidth of the target frequency;

the subcarrier spacing of the currently camped service frequency is different from that of the target frequency; and the reference signal type of the currently camped service frequency is different from that of the target frequency.

In the embodiment of the present disclosure, optionally, the first processing module 602 is further configured in such a manner: when only one BWP or beam to be camped on is allowed to be reselected, any BWP or beam which satisfies the second criterion and can be camped on by the UE is reselected according to the reselection configuration information; or, when only one BWP or beam to be camped on is allowed to be reselected, according to the reselection configuration information, a BWP or beam satisfying the second criterion and having the best signal quality or the best signal strength can be reselected as the BWP or beam on which the UE is able to camp; or, when more than one BWP or beam to be camped on is allowed to be reselected, more than one BWP or beam which satisfies the second criterion and can be camped on by the UE is reselected according to the reselection configuration information.

In the embodiment of the present disclosure, optionally, the second criterion may be: reselecting the BWP or beam on which the UE is able to camp according to the priority of the configured BWP or beam.

In the embodiment of the present disclosure, optionally, the selection or reselection configuration information may include arbitrary combination of one or more of: selection configuration information of the BWP or the beam; and, reselection configuration information of the BWP or the beam.

In the embodiment of the present disclosure, optionally, the selection configuration information of a BWP or a beam may include arbitrary combination of one or more of: one or more offset; minimum received signal strength requirements; minimum received signal quality requirements; compensation amount; reference signal type; subcarrier spacing; and BWP identification information or beam identification information.

In the embodiment of the present disclosure, optionally, the reselection configuration information of a BWP or a beam may include arbitrary combination of one or more of: one or more offsets; one or more speed-based scaling factor; minimum received signal strength requirements; minimum received signal quality requirements; reselection evaluation time; reference signal type; subcarrier spacing; threshold value for initiating non-service BWP or beam measurement; priority identification; and BWP identification information or beam identification information.

In the embodiment of the present disclosure, optionally, initiating a non-service BWP or beam measurement should satisfy the following criteria: the S value of the selection criterion of one or more service BWP or beam is less than or equal to the configured threshold value.

In an embodiment of the present disclosure, optionally, the BWP identification information includes arbitrary combination of one or more of: a BWP identifier, a frequency identifier, a frequency offset identifier, a bandwidth identifier, a PRB identifier and a PRB offset identifier.

In an embodiment of the present disclosure, optionally, the beam identification information includes arbitrary combination of one or more of: a synchronization signal block identifier, a CSI-RS identifier, a beam identifier, a beam pair identifier, and a transmission node identifier.

The user equipment provided by the embodiment of the present disclosure can perform the above method embodiment, and its implementation principle and technical effect are similar, the details thereof will not be repeated here.

In some embodiments of the present disclosure, a network-side device is also provided which has the same principle as the method for camping in the above embodiments of the present disclosure. The implementation of the network-side device may refer to the method for camping, the details of which are omitted here.

Figure 7:
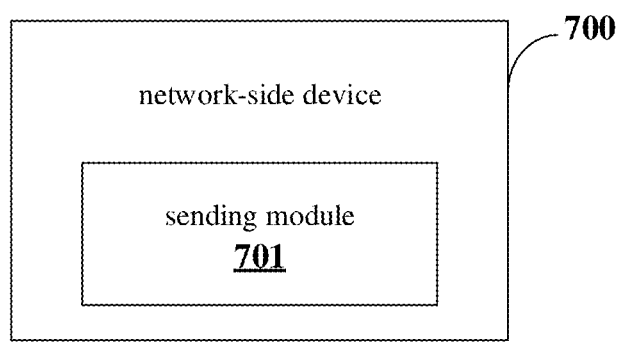
FIG. 7 is a first structural diagram of a network-side device according to an embodiment of the present disclosure.

Referring to FIG. 7, it shows the structure of the network-side device 700 according to an embodiment of the present disclosure, the network-side device 700 includes:

a sending module 701 for sending the selection or reselection configuration information to the UE, the UE camping on the BWP or beam on which the corresponding UE is able to camp according to the selection or reselection configuration information, wherein the selection or reselection configuration information indicates a location of the BWP or the beam.

In the embodiment of the present disclosure, optionally, the BWP on which the UE is able to camp includes arbitrary combination of one or more of the following: the BWP containing the synchronization information block (SSB), the BWP containing the channel state information reference signal (CSI-RS), the BWP containing the cell-defining SSB, the default BWP and the initial BWP.

The beam on which the UE is able to camp includes arbitrary combination of one or more of the following: the beam containing SSB, the beam containing CSI-RS, the beam containing the cell-defining SSB, the default beam and the initial beam.

In the embodiment of the present disclosure, optionally, the selection or reselection configuration information may include arbitrary combination of one or more of: selection configuration information of the BWP or the beam; and, reselection configuration information of the BWP or the beam.

In the embodiment of the present disclosure, optionally, the selection configuration information of a BWP or a beam may include arbitrary combination of one or more of: one or more offset; minimum received signal strength requirements; minimum received signal quality requirements; compensation amount; reference signal type; subcarrier spacing; and BWP identification information or beam identification information.

In the embodiment of the present disclosure, optionally, the reselection configuration information of a BWP or a beam may include arbitrary combination of one or more of: one or more offsets; one or more speed-based scaling factor; minimum received signal strength requirements; minimum received signal quality requirements; reselection evaluation time; reference signal type; subcarrier spacing; threshold value for initiating non-service BWP or beam measurement; priority identification; and BWP identification information or beam identification information.

In the embodiment of the present disclosure, optionally, initiating a non-service BWP or beam measurement should satisfy the following criteria: the S value of the selection criterion of one or more service BWP or beam is less than or equal to the configured threshold value.

In an embodiment of the present disclosure, optionally, the BWP identification information includes arbitrary combination of one or more of: a BWP identifier, a frequency identifier, a frequency offset identifier, a bandwidth identifier, a PRB identifier and a PRB offset identifier.

In an embodiment of the present disclosure, optionally, the beam identification information includes arbitrary combination of one or more of: a synchronization signal block identifier, a CSI-RS identifier, a beam identifier, a beam pair identifier, and a transmission node identifier.

The network-side device provided in the embodiment of the present disclosure can perform the above method embodiment, and has similar principle and technical effects, which will not be repeated in the embodiment here.

Figure 8:
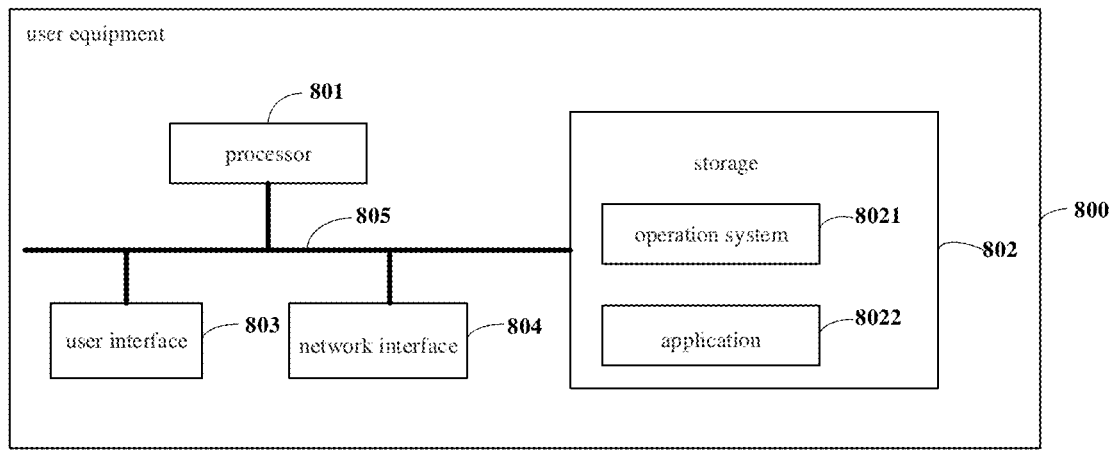
FIG. 8 is a second structural diagram of a UE according to an embodiment of the present disclosure.

As shown in FIG. 8, the user equipment 800 includes at least one processor 801, a storage 802, at least one network interface 804 and a user interface 803. Various components in the user equipment 800 are coupled together via a bus system 805. It will be appreciated that, the bus system 805 is used to realize connection and communication between these components. In addition to a data bus, the bus system 805 also includes a power bus, a control bus, and a status signal bus. However, for the sake of clarity, various buses are marked as the bus system 805 in FIG. 8.

The user interface 803 may include a display, a keyboard, or a pointing device (for example, a mouse, a trackball, a touch pad, or a touch screen, etc.).

It will be appreciated that the storage 802 in the embodiment of the present disclosure may be a volatile memory or a non-volatile memory, or may include both the volatile memory and the non-volatile memory. Among them, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. By way of example but not limitation, many forms of RAM are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The storage 802 of the system and method described in the embodiments of the present disclosure is intended to include, but is not limited to, these and any other suitable types of storages.

In some embodiments, the storage 802 stores the following elements, executable modules or data structures, or their subsets, or their extended sets: an operating system 8021 and an application 8022.

The operating system 8021 includes various system programs, such as a framework layer, a core library layer, and a driver layer, etc., for implementing various basic services and processing hardware-based tasks. The application 8022 includes various applications, such as a media player, a browser, etc., for implementing various application services. The program for implementing the methods of the embodiments of the present disclosure may be included in the application 8022.

In an embodiment of the present disclosure, the programs or instructions stored in the storage 802 (specifically, which may be the programs or instructions stored in the application 8022) are called and executed to implement the following steps: receiving selection or reselection configuration information, wherein the selection or reselection configuration information indicates a location of a bandwidth part (BWP) or a beam; and according to the selection or reselection configuration information, camping on the BWP or beam on which the corresponding UE is able to camp.

The user equipment provided by the embodiment of the present disclosure can implement the above method embodiments, and the principle and technical effects thereof are similar to those of the methods. Thus, the repetition will not be described in the embodiment.

Figure 9:
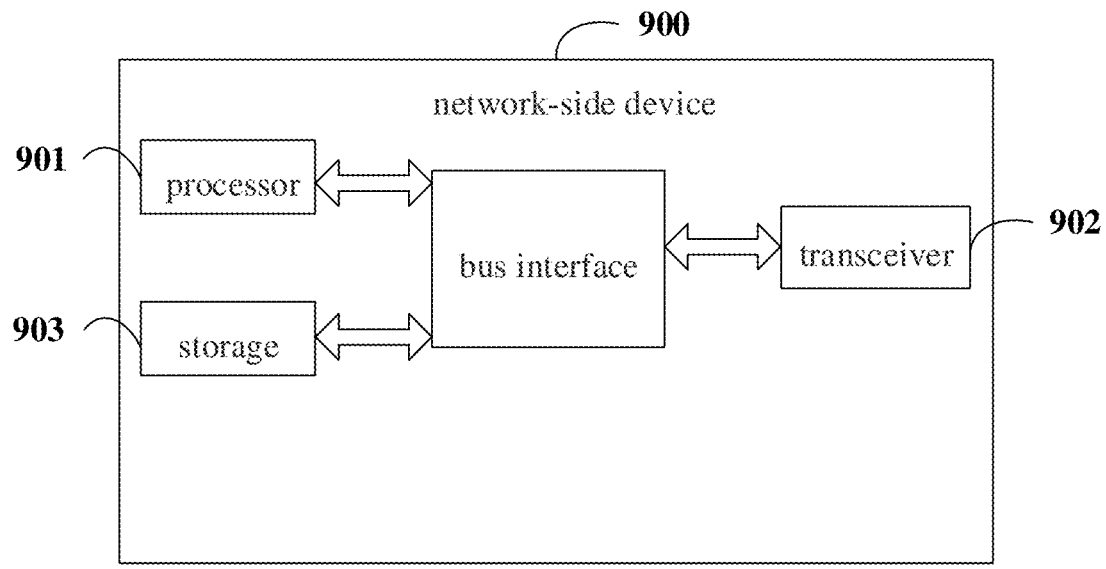
FIG. 9 is a second structural diagram of a network-side device according to an embodiment of the present disclosure.

Referring to FIG. 9, it is a structural diagram of a network-side device applied in the embodiment. As shown in FIG. 9, the network-side device 900 includes a processor 901, a transceiver 902, a storage 903 and a bus interface, wherein:

in the embodiment of the present disclosure, the network-side device 900 further includes a computer program stored on the storage 903 and capable of running on the processor 901. When executed by the processor 901, the computer program implements the following steps: sending the selection or reselection configuration information to the UE, wherein the UE camps on the BWP or beam on which the corresponding UE is able to camp according to the selection or reselection configuration information, the selection or reselection configuration information indicates a location of a bandwidth part (BWP) or a beam.

In FIG. 9, the bus architecture may include any number of interconnected buses and bridges, which are linked together specifically by various circuits such as one or more processors represented by the processor 901 and the storage represented by the storage 903. The bus architecture can also link various other circuits such as peripheral devices, voltage regulators, and power management circuits, etc., which are well known in the art, and therefore, they will not be further described herein. The bus interface provides interfaces. The transceiver 902 may be a plurality of elements, including a transmitter and a receiver, and provides units for communicating with various other devices on a transmission medium.

The processor 901 is responsible for managing the bus architecture and general processing, and the storage 903 may store data used by the processor 901 when performing operations.

The network-side device provided by the embodiment of the present disclosure can implement the above method embodiments, and the principle and technical effects thereof are similar to those of the methods. Thus, the repetition will not be described in the embodiment.

The steps of the methods or algorithms described in conjunction with the disclosed contents of the present disclosure may be implemented by hardware, or by a processor executing software instructions. The software instructions may be composed of corresponding software modules, which may be stored in RAM, flash memory, ROM, EPROM, EEPROM, registers, hard disk, mobile hard disk, read-only optical disk, or any other form of storage medium well known in the art. An exemplary storage medium is coupled to the processor so that the processor can read information from the storage medium and can write information to the storage medium. Obviously, the storage medium may also be a component of the processor. The processor and the storage medium may be located in an ASIC. In addition, the ASIC may be located in a core network interface device. Obviously, the processor and the storage medium may also exist as discrete components in the core network interface device.

Those skilled in the art should realize that in one or more of the above examples, the functions described in the present disclosure may be implemented by hardware, software, firmware, or arbitrary combination thereof. When implemented in software, these functions can be stored in a computer-readable medium or transmitted as one or more instructions or codes on a computer-readable medium. The computer-readable medium includes the computer storage medium and the communication medium, and the communication medium includes any medium that facilitates transferring a computer program from one place to another. The storage medium may be any available medium that can be accessed by a general-purpose or special-purpose computer.

The specific embodiments described above further describe the purpose, technical solutions and beneficial effects of the present disclosure in detail. It will be appreciated that the above are only specific embodiments of the present disclosure and are not intended to limit the scope of the present disclosure. Any modifications, equivalent alternatives, improvements, etc., based on the technical solutions of the present disclosure, should be included in the protective scope of the present disclosure.

Those skilled in the art should understand that the embodiments of the present disclosure may be provided as a method, a system, or a computer program product. Therefore, the embodiments of the present disclosure may take the form of an entirely hardware embodiment, an entirely software embodiment, or an embodiment combining software and hardware aspects. Moreover, the embodiments of the present disclosure may take the form of a computer program product implemented on one or more computer-usable storage media (including but not limited to disk storage, CD-ROM, optical storage, etc.) containing computer-usable program codes therein.

The embodiments of the present disclosure are described with reference to flowcharts and/or block diagrams of methods, devices (systems), and computer program products according to the embodiments of the present disclosure. It will be appreciated that each process and/or block in the flowcharts and/or block diagrams, and combinations of processes and blocks in the flowcharts and block diagrams may be implemented by computer program instructions. These computer program instructions may be provided to a processor of a general purpose computer, special purpose computer, embedded processor, or other programmable data processing device to produce a machine, such that the instructions executed by the processor of the computer or other programmable data processing device generate means for implementing the functions specified in one or more of the processes in the flowcharts and/or one or more of the blocks in the block diagrams.

These computer program instructions may also be stored in a computer-readable storage capable of directing a computer or other programmable data processing device to work in a specific manner, such that the instructions stored in the computer-readable storage produce a manufactured article including the instruction means which implements the functions specified in one or more of the processes in the flowcharts and/or one or more of the blocks in the block diagrams.

These computer program instructions may also be loaded on a computer or other programmable data processing devices, so that a series of operation steps can be performed on the computer or other programmable devices to produce a computer-implemented process, so that the instructions executed on the computer or other programmable device provide the steps for implementing the functions specified in one or more of the processes in the flowcharts and/or one or more of the blocks in the block diagrams.

Obviously, those skilled in the art can make various modifications and variations to the embodiments of the present disclosure without departing from the spirit and scope of the present disclosure. Thus, if these modifications and variations of the embodiments of the present disclosure fall within the scope of the claims of the present disclosure and their equivalent technologies, the present disclosure also intends to include these modifications and variations.

What is claimed is:

1. A method for camping, applied to a user equipment (UE), comprising:
   receiving selection or reselection configuration information,
   wherein the selection or reselection configuration information indicates a location of a bandwidth part (BWP) or a beam; and
   according to the selection or reselection configuration information, camping on the BWP or beam on which the corresponding UE is able to camp,
   wherein according to the selection or reselection configuration information, camping on the BWP or beam on which the corresponding UE is able to camp comprises:
   selecting any BWP or beam satisfying a first criterion that can be camped on by the UE according to the selection configuration information, when only one BWP or beam to be camped on is allowed to be selected; or,
   selecting a BWP or beam satisfying the first criterion and having the best signal quality or the best signal strength as the BWP or beam on which the UE is able to camp according to the selection configuration information, when only one BWP or beam to be camped on is allowed to be selected; or,
   selecting more than one BWP or beam which satisfies the first criterion and can be camped on by the UE according to the selection configuration information, when more than one BWP or beam to be camped on is allowed to be selected.

2. The method according to claim 1, wherein the BWP or beam on which the UE can camp is selected in any order or from any one of the following:
   selecting a cell or frequency to camp on;
   selecting one or more BWP to camp on; and
   selecting one or more beam to camp on.

3. The method according to claim 1, wherein the selecting more than one BWP or beam which satisfies the first criterion and can be camped on by the UE according to the selection configuration information, when more than one BWP or beam to be camped on is allowed to be selected, comprises:
when there is one or more BWP or beam among the selected one or more BWP or beam that does not satisfy the first criterion, according to the selection configuration information, not selecting the BWP or beam that does not satisfy the first criterion to be camped on; or,
when one or more BWP or beam satisfying the first criterion has been selected to be camped on, if there is other BWP or beam on which the UE is able to camp satisfies the first criterion, according to the selection configuration information, selecting those other BWPs or beams on which the UE is able to camp and which satisfy the first criterion additionally.

4. The method according to claim 1, wherein the reselection order of reselecting the BWP or beam on which the UE can camp may be any order or any one of the following:
reselecting a cell or frequency to camp on;
reselecting one or more BWP to camp on; and
reselecting one or more beam to camp on.

5. The method according to claim 1, wherein the according to the selection or reselection configuration information, camping on the BWP or beam on which the corresponding UE is able to camp comprises:
judging whether the BWP or beam on which the UE can camp is to be reselected by intra-frequency reselection or inter-frequency reselection, according to the condition of inter-frequency reselection;
if the condition of inter-frequency reselection is satisfied, according to the reselection configuration information, reselecting the BWP or beam on which the UE can camp by inter-frequency reselection; if not, according to the reselection configuration information, reselecting one or more BWP or beam on which the UE can camp by intra-frequency reselection;
wherein, the conditions for inter-frequency reselection comprises arbitrary combination of one or more of the following:
the currently camped service frequency is different from the target frequency;
the bandwidth of the currently camped service frequency is different from the bandwidth of the target frequency;
the subcarrier spacing of the currently camped service frequency is different from that of the target frequency; and
the reference signal type of the currently camped service frequency is different from that of the target frequency.

6. The method according to claim 1, wherein the according to the selection or reselection configuration information, camping on the BWP or beam on which the corresponding UE is able to camp comprises:
when only one BWP or beam to be camped on is allowed to be reselected, reselecting any BWP or beam which satisfies the second criterion and can be camped on by the UE according to the reselection configuration information;
when only one BWP or beam to be camped on is allowed to be reselected, according to the reselection configuration information, reselecting a BWP or beam satisfying the second criterion and having the best signal quality or the best signal strength as the BWP or beam on which the UE is able to camp; or,
when more than one BWP or beam to be camped on is allowed to be reselected, reselecting more than one BWP or beam which satisfies the second criterion and can be camped on by the UE according to the reselection configuration information.

7. The method according to claim 1, wherein the selection configuration information comprises arbitrary combination of one or more of: one or more offset; minimum received signal strength requirements; minimum received signal quality requirements; compensation amount; reference signal type; subcarrier spacing; and BWP identification information or beam identification information.

8. The method according to claim 1, wherein the reselection configuration information comprises arbitrary combination of one or more of: one or more offsets; one or more speed-based scaling factor; minimum received signal strength requirements; minimum received signal quality requirements; reselection evaluation time; reference signal type; subcarrier spacing; threshold value for initiating non-service BWP or beam measurement; priority identification; and BWP identification information or beam identification information.

9. The method according to claim 1, wherein,
the BWP on which the UE is able to camp comprises arbitrary combination of one or more of:
a BWP containing the synchronization information block (SSB);
a BWP containing the channel state information reference signal (CSI-RS);
a BWP containing the cell-defining SSB;
a default BWP; and
an initial BWP;
the beam on which the UE is able to camp comprises arbitrary combination of one or more of:
a beam containing SSB;
a beam containing CSI-RS;
a beam containing the cell-defining SSB;
a default beam; and
an initial beam.

10. A non-transitory computer readable storage medium having a computer program stored thereon, the computer program performing, when executed by a processor, the steps of the method for camping according to claim 1.

11. A method for camping, applied to a network-side device, comprising:
sending the selection or reselection configuration information to the UE,
wherein the UE camps on the BWP or beam on which the corresponding UE is able to camp according to the selection or reselection configuration information, the selection or reselection configuration information indicates a location of a bandwidth part (BWP) or a beam,
wherein the UE camps on the BWP or beam on which the corresponding UE is able to camp according to the selection or reselection configuration information comprises:
select any BWP or beam satisfying a first criterion that can be camped on by the UE according to the selection configuration information, when only one BWP or beam to be camped on is allowed to be selected; or,
select a BWP or beam satisfying the first criterion and having the best signal quality or the best signal strength as the BWP or beam on which the UE is able to camp according to the selection configuration information, when only one BWP or beam to be camped on is allowed to be selected; or, select more than one BWP or beam which satisfies the first criterion and can be camped on by the UE according to the selection configuration information, when more than one BWP or beam to be camped on is allowed to be selected.

12. The method according to claim 11, wherein the selection configuration information comprises arbitrary combination of one or more of: one or more offset; minimum received signal strength requirements; minimum received signal quality requirements; compensation amount; reference signal type; subcarrier spacing; and BWP identification information or beam identification information.

13. The method according to claim 11, wherein the reselection configuration information comprises arbitrary combination of one or more of: one or more offsets; one or more speed-based scaling factor; minimum received signal strength requirements; minimum received signal quality requirements; reselection evaluation time; reference signal type; subcarrier spacing; threshold value for initiating non-service BWP or beam measurement; priority identification; and BWP identification information or beam identification information.

14. The method according to claim 11, wherein,
the BWP on which the UE is able to camp comprises arbitrary combination of one or more of:
a BWP containing the synchronization information block (SSB);
a BWP containing the channel state information reference signal (CSI-RS);
a BWP containing the cell-defining SSB;
a default BWP; and
an initial BWP;
the beam on which the UE is able to camp comprises arbitrary combination of one or more of:
a beam containing SSB;
a beam containing CSI-RS;
a beam containing the cell-defining SSB;
a default beam; and
an initial beam.

15. A network-side device comprising: a processor, a storage, and a computer program stored on the storage and capable of running on the processor, the computer program performing, when executed by the processor, the steps of the method for camping according to claim 11.

16. A user equipment comprising: a processor, a storage, and a computer program stored on the storage and capable of running on the processor, the computer program performing, when executed by the processor, steps of a method for camping, the method comprising:

receiving selection or reselection configuration information, wherein the selection or reselection configuration information indicates a location of a bandwidth part (BWP) or a beam; and
according to the selection or reselection configuration information, camping on the BWP or beam on which the corresponding UE is able to camp;
wherein according to the selection or reselection configuration information, camping on the BWP or beam on which the corresponding UE is able to camp comprises:
selecting any BWP or beam satisfying a first criterion that can be camped on by the UE according to the selection configuration information, when only one BWP or beam to be camped on is allowed to be selected; or,
selecting a BWP or beam satisfying the first criterion and having the best signal quality or the best signal strength as the BWP or beam on which the UE is able to camp according to the selection configuration information, when only one BWP or beam to be camped on is allowed to be selected; or,
selecting more than one BWP or beam which satisfies the first criterion and can be camped on by the UE according to the selection configuration information, when more than one BWP or beam to be camped on is allowed to be selected.

17. The user equipment according to claim 16, wherein in the method for camping performed by the computer program when executed by the processor, the BWP or beam on which the UE can camp is selected in any order or from any one of the following:
selecting a cell or frequency to camp on;
selecting one or more BWP to camp on; and
selecting one or more beam to camp on.

18. The user equipment according to claim 16, wherein in the method for camping performed by the computer program when executed by the processor, the step of the selecting more than one BWP or beam which satisfies the first criterion and can be camped on by the UE according to the selection configuration information, when more than one BWP or beam to be camped on is allowed to be selected, comprises: when there is one or more BWP or beam among the selected one or more BWP or beam that does not satisfy the first criterion, according to the selection configuration information, not selecting the BWP or beam that does not satisfy the first criterion to be camped on; or, when one or more BWP or beam satisfying the first criterion has been selected to be camped on, if there is other BWP or beam on which the UE is able to camp satisfies the first criterion, according to the selection configuration information, selecting those other BWPs or beams on which the UE is able to camp and which satisfy the first criterion additionally.

* * * * *